(12) United States Patent
Skowyra et al.

(10) Patent No.: US 10,819,752 B2
(45) Date of Patent: Oct. 27, 2020

(54) SYSTEMS AND METHODS FOR QUANTITATIVE ASSESSMENT OF A COMPUTER DEFENSE TECHNIQUE

(71) Applicant: Massachusetts Institute of Technology, Cambridge, MA (US)

(72) Inventors: Richard W. Skowyra, Somerville, MA (US); Steven R. Gomez, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 71 days.

(21) Appl. No.: 15/829,827

(22) Filed: Dec. 1, 2017

(65) Prior Publication Data
US 2019/0173923 A1 Jun. 6, 2019

(51) Int. Cl.
*H04L 29/06* (2006.01)
*G06F 17/11* (2006.01)
(Continued)

(52) U.S. Cl.
CPC .......... *H04L 63/205* (2013.01); *G06F 16/903* (2019.01); *G06F 16/9027* (2019.01);
(Continued)

(58) Field of Classification Search
CPC . H04L 63/205; H04L 63/105; H04L 63/1433; H04L 63/1441; G06F 16/903; G06F 16/9027; G06F 17/11; G06N 5/02
See application file for complete search history.

(56) References Cited

U.S. PATENT DOCUMENTS

| 9,117,069 B2 * | 8/2015 | Oliphant | H04L 63/1416 |
| 2013/0096980 A1 * | 4/2013 | Basavapatna | G06Q 10/00 705/7.28 |

(Continued)

OTHER PUBLICATIONS

Anderson, Computer Security Technology Plannign Study, vol. 2. James P. Anderson and Company. AD-772 806. 143 pages. Oct. 1972.

(Continued)

*Primary Examiner* — Michael R Vaughan
*Assistant Examiner* — Jessica J South
(74) *Attorney, Agent, or Firm* — McCarter & English, LLP; David R. Burns

(57) ABSTRACT

A computer-implemented method for quantitatively assessing a defense technique. The method includes executing a reasoning engine that receives as an input to the reasoning engine a query that includes an indicia of a defense technique to a computer security threat. The method further includes translating the defense technique into a propositional logic constraint on a queryable representation of a Boolean formula representing a model complied from a set of computer security threats and a set of defense techniques. The method also includes performing an assessment of the defense technique based on the propositional logic constraint on the queryable representation, to quantify the defense technique relative to a member of the set of computer security threats. The method further includes displaying a result of the assessment to indicate a level of security provided by the defense technique to the member.

39 Claims, 17 Drawing Sheets

(51) Int. Cl.
G06N 5/02 (2006.01)
G06F 16/903 (2019.01)
G06F 16/901 (2019.01)
(52) U.S. Cl.
CPC ............... G06F 17/11 (2013.01); G06N 5/02 (2013.01); H04L 63/105 (2013.01); H04L 63/1433 (2013.01); H04L 63/1441 (2013.01)

(56) References Cited

U.S. PATENT DOCUMENTS

| | | | |
|---|---|---|---|
| 2015/0186335 A1* | 7/2015 | Senalp | G06N 5/00 703/2 |
| 2016/0098558 A1* | 4/2016 | Vedula | G06F 21/71 726/23 |
| 2017/0346839 A1* | 11/2017 | Peppe | G06F 21/577 |
| 2018/0020021 A1* | 1/2018 | Gilmore | H04L 63/1408 |

OTHER PUBLICATIONS

Baratloo et al., Transparent Run-Time Defense Against Stack Smashing Attacks. USENIX Annual Technical Conference. pp. 251-262 (2000).
Becher et al., FireWire, all your memory are belong to us. CanSecWest, slideshow. http://md.hudora.de/presentations/#firewire-cansecwest. 40 pages (2005).
Bigelow et al., Timely Rerandomization for Mitigating Memory Disclosures. Proceedings of CCS'15. 12 pages. (2015).
Carlini et al., Control-Flow Bending: On the Effectiveness of Control-Flow Integrity. Proceedings of the 24th USENIX Security Symposium. 17 pages, Aug. 12-14, 2015.
Cowan et al., Protecting Systems from Stack Smashing Attacks with StackGuard. Linux Expo. 11 pages. (1999).
Crane et al., Readactor: Practical Code Randomization Resilient to Memory Disclosure. Proceedings of IEEE S&P. 18 pages. (2015).
CVE, Common Vulnerabilities and Exposures, CVE-2015-7545. Retrieved online at: https://cve.mitre.org/cgi-bin/cvename.cgi?name=CVE-2015-7545. 2 pages. Sep. 29, 2015.
Darwiche, A Compiler for Deterministic, Decomposable Negation Normal Form. AAAI/IAAI, pp. 627-634. (2002).
Darwiche, On the Tractable Counting of Theory Models and its Application to Truth Maintenance and Belief Revision. Journal of Applied Non-Classical Logics. 2001;11(1-2):11-34.
De Raadt, OpenBSD 3.3. Retrieved online at: http://www.openbsd.org/33.html. 7 pages. May 1, 2003.
Evans et al., Control Jujutsu: On the Weaknesses of Fine-Grained Control Flow Integrity. CCS' 15. 13 pages. Oct. 12-16, 2015.
Evans, [0day] [exploit] Advancing exploitation: a scriptless 0day exploit against Linux desktops. scarybeasts, Security. Retrieved online at: https://scarybeastsecurity.blogspot.com/2016/11/0day-exploit-advancing-exploitation.html. 13 pages. Nov. 21, 2016.
Hiser et al., ILR: Where'd My Gadgets Go? 2012 IEEE Symposium on Security and Privacy (SP). 15 pages. (2012).
Hu et al., Data_Oriented Programming: On the Expressiveness of Non-Control Data Attacks. 2016 IEEE Symposium on Security and Privacy. pp. 969-986 (2016).
Kim et al., Flipping Bits in MemoryWithout Accessing Them: An Experimental Study of DRAM Disturbance Errors. ACM SIGARCH Computer Architecture News. 2014;42:361-372.
Kordy et al., Foundations of Attack-Defense Trees. International Workshop on Formal Aspects in Security and Trust. 16 pages. (2010).
Kuznetsov et al., Code-Pointer Integrity. Proceedings of the 11th USENIX Symposium on Operating Systems and Implementation (OSDI). 17 pages. Oct. 2014.
Larsen et al., SoK: Automated Software Diversity. 2014 IEEE Symposium on Security and Privacy. 16 pages. (2014).
Madan et al., A method for modeling and quantifying the security attributes of intrusion tolerant systems. Performance Evaluations. 2004;56:167-186.
Onarlioglu et al., G-Free: Defeating Return-Oriented Programming through Gadget-less Binaries. Proceedings of the ACSAC. 10 pages. (2010).
PaX: Pax address splace layout randomization. Retrieved online at: http//pax.grsecurity.net/docs/aslr.txt. 5 pages. (2003).
Roy et al., Cyber security analysis using attack countermeasure trees. CSIIRW '10, Proceedings of the Sixth Annual Workshop on Cyber Security and Information Intelligence Research. (2010).
Rudd et al., Address-Oblivious Code Reuse: On the Effectiveness of Leakage-Resilient Diversity. NDSS '17. 15 pages. (2017).
Schuster et al., Counterfeit Object-oriented Programming. On the Difficulty of Preventing Code Reuse Attacks in C ++ Applications. IEEE Symposium on Security and Privacy. 18 pages. (2015).
Seibert et al., Information Leaks Without Memory Disclosures: Remote Side Channel Attacks on Diversified Code. CCS '14. 12 pages. Nov. 3-7, 2014.
Sevinsky, Funderbolt: Adventures in Thunderbolt DMA Attacks. Retrieved online at: http://www.blackhat.com/us-13/briefings.html#sevinsky. blackhat® USA. 1 page. (2013).
Shacham, The Geometry of Innocent Flesh on the Bone: Return-into-libc without Function Calls (on the x86). Proceedings of ACM CCS 2007, ACM Press. pp. 1-30. (2007).
Sheyner et al., Automated Generation and Analysis of Attack Graphs. Proceedings of the 2002 IEEE Symposium on Security and Privacy (S&P'02). 12 pages. (2002).
Skowyra et al., Systematic Analysis of Defenses Against Return-Oriented Programming. Proceedings of RAID. 20 pages. (2013).
Skybox Security, Managing the Brave New World of Cloud Security. Retrieved online at: https://www.skyboxsecurity.com/cloud. 3 pages. (2017).
Snow et al., Just-In-Time Code Reuse: On the Effectiveness of Fine-Grained Address Space Layout Randomization. IEEE Symposium on Security and Privacy. 15 pages. (2013).
Strackx et al., Breaking the memory secrecy assumption. EUROSEC '09. 8 pages. (2009).
Szekeres et al., SoK: Eternal War in Memory. IEEE Symposium on Security and Privacy. 15 pages. (2013).
Wartell et al., Binary Stirring: Self-randomizing Instruction Addresses of Legacy x86 Binary Code. CCS'12. 12 pages. Oct. 16-18, 2012.
Zou et al., Modeling and Simulation of the Propogation and Defense of Internet Email Worm. IEEE TDSC;2007;4(2):1-14.

* cited by examiner

330

$$\chi_{atk} = \bigwedge_{a \in A} a$$

$$\phi_{atk} = \chi_{atk} \wedge a_g$$

FIG. 3C

340 dcap Control_Flow_Integrity_Coarse_Grained assures (Function_Return.Dereference_Event implies (Entry_Point.Code_Pointer_Dereference | {Call_Site.Entry_Point})) and (Explicit_Dereference.Dereference_Event implies (Entry_Point.Code_Pointer_Dereference | {Function.Entry_Point}))

FIG. 3D $$\phi_{def} = \bigwedge_{d \in D} d$$
$$\phi_{full} = \phi_{def} \wedge \phi_{atk}$$

$$\forall d \in D : \text{Coverage}(d) = 1 - G(S_d)G(S_{off})^{-1}$$

| Defense | Constraint | Coverage |
|---|---|---|
| Readactor | Memory_Accessed → (Data ∧ ¬Text) ∧ Memory_Layout_Known → (Memory_Image_Known ∧ ¬Disk_Image_Known) ∧ Function_Pointer_Type → (Trampoline ∧ ¬Direct) ∧ Return_Address_Type → (Trampoline ∧ ¬Direct) ∧ Semantic_Abstraction_Level → (¬Counterfeit_Objects ∧ Counterfeit_Procedures) | 0.32 |
| Stack Canaries | ¬Memory_Layout_Known → (Overflow → Process_Control_Data → (¬Return_Address ∧ (Exception_Handler ∨ Heap_Metadata ∨ Virtual_Function_Table))) | 0.046 |

$$\forall a \in A : Criticality(a, D) = \frac{\partial G(D)}{\partial a} G(D)^{-1}$$

| Attack Capability | Attack Criticality | Defenses Bypassed |
|---|---|---|
| Partial Pointer Overwrites | 0.663 | TASR |
| Software-Based DMA Attacks | 0.651 | DEP, Readactor, CPI |
| Data-based memory disclosure | 0.595 | ASLR, TASR, CPI |
| Code reuse inside control-flow graph | 0.543 | CFI |
| Semantic code reuse | 0.531 | Gadget Smashing |

FIG. 4D

SYSTEMS AND METHODS FOR QUANTITATIVE ASSESSMENT OF A COMPUTER DEFENSE TECHNIQUE

SPONSORSHIP

This invention was made with Government support under Contract No. FA8721-05-C-0002 awarded by the U.S. Air Force. The Government has certain rights in the invention.

BACKGROUND

Computer security has long been an arms race between security threats and defense techniques. While new defense techniques are proposed and built to stop security threats, new and sophisticated attacks are devised by attackers to bypass them. Existing approaches for analyzing computer security threats and defense techniques include low-level frameworks such as attack graphs and high-level frameworks such as risk modeling and simulations.

SUMMARY

Exemplary embodiments of the present disclosure are directed to assessing a defense technique.

In one embodiment, a computer-implemented method for assessing a defense technique is provided. The method includes executing a reasoning engine that receives as an input to the reasoning engine a query that includes an indicia of a defense technique to a computer security threat. The reasoning engine translates the defense technique into a propositional logic constraint on a queryable representation of a Boolean formula representing a model complied from a set of computer security threats and a set of defense techniques. The reasoning engine performs an assessment of the defense technique based on the propositional logic constraint on the queryable representation, to quantify the defense technique relative to a member of the set of computer security threats. The reasoning engine displays a result of the assessment to indicate a level of security provided by the defense technique to the member.

In another embodiment, a system including a memory storing executable instructions to execute a reasoning engine is provided. The reasoning engine receives as an input a query that includes an indicia of a defense technique to a computer security threat. The reasoning engine translates the defense technique into a propositional logic constraint on a queryable representation of a Boolean formula representing a model complied from a set of computer security threats and a set of defense techniques. The reasoning engine performs an assessment of the computer defense based on the propositional logic constraint on the queryable representation, to quantify the defense technique relative to a member of the set of computer security threats. The reasoning engine displays a result of the assessment to indicate a level of security provided by the defense technique to the member. The system further includes a processor coupled to the memory to execute the executable instructions stored therein to generate as output the result of the query.

In another embodiment, a non-transitory computer readable medium storing instructions executable by a processing device is provided. The execution of the instructions causes the processing device to implement a method of assessing a defense technique. The method includes receiving, using a reasoning engine, as an input a query that includes an indicia of a defense technique to a computer security threat. The method also includes translating, using the reasoning engine, the defense technique into a propositional logic constraint on a queryable representation of a Boolean formula representing a model complied from a set of computer security threats and a set of defense techniques. The method further includes performing, using the reasoning engine, an assessment of the defense technique based on the propositional logic constraint on the queryable representation, to quantify the defense technique relative to a member of the set of computer security threats. The method also includes displaying, using the reasoning engine, a result of the assessment to indicate a level of security provided by the defense technique to the member.

BRIEF DESCRIPTION OF THE DRAWINGS

The accompanying drawings, which are incorporated in and constitute a part of this specification, illustrate one or more embodiments taught herein of the invention and, together with the description, help to explain the embodiments taught herein. The embodiments are illustrated by way of example and should not be construed to limit the present disclosure. In the drawings:

FIG. 3C illustrates the ACG represented as a unified attack capability model, according to an exemplary embodiment;

FIG. 3D illustrates a domain-specific language to express constraints of defense techniques, according to an exemplary embodiment;

FIG. 3E illustrates a Boolean formula representing defense techniques and security threats, according to an exemplary embodiment;

FIG. 4A is a formula for computation of a defense coverage metric, according to an exemplary embodiment;

FIG. 4B illustrates defense coverage metrics for defense techniques, according to an exemplary embodiment;

FIG. 4C is a formula for computation of an attack criticality metric, according to an exemplary embodiment;

FIG. 4D is an example of attack criticality metrics for a set of computer attack capabilities, according to an exemplary embodiment;

Figure 1:
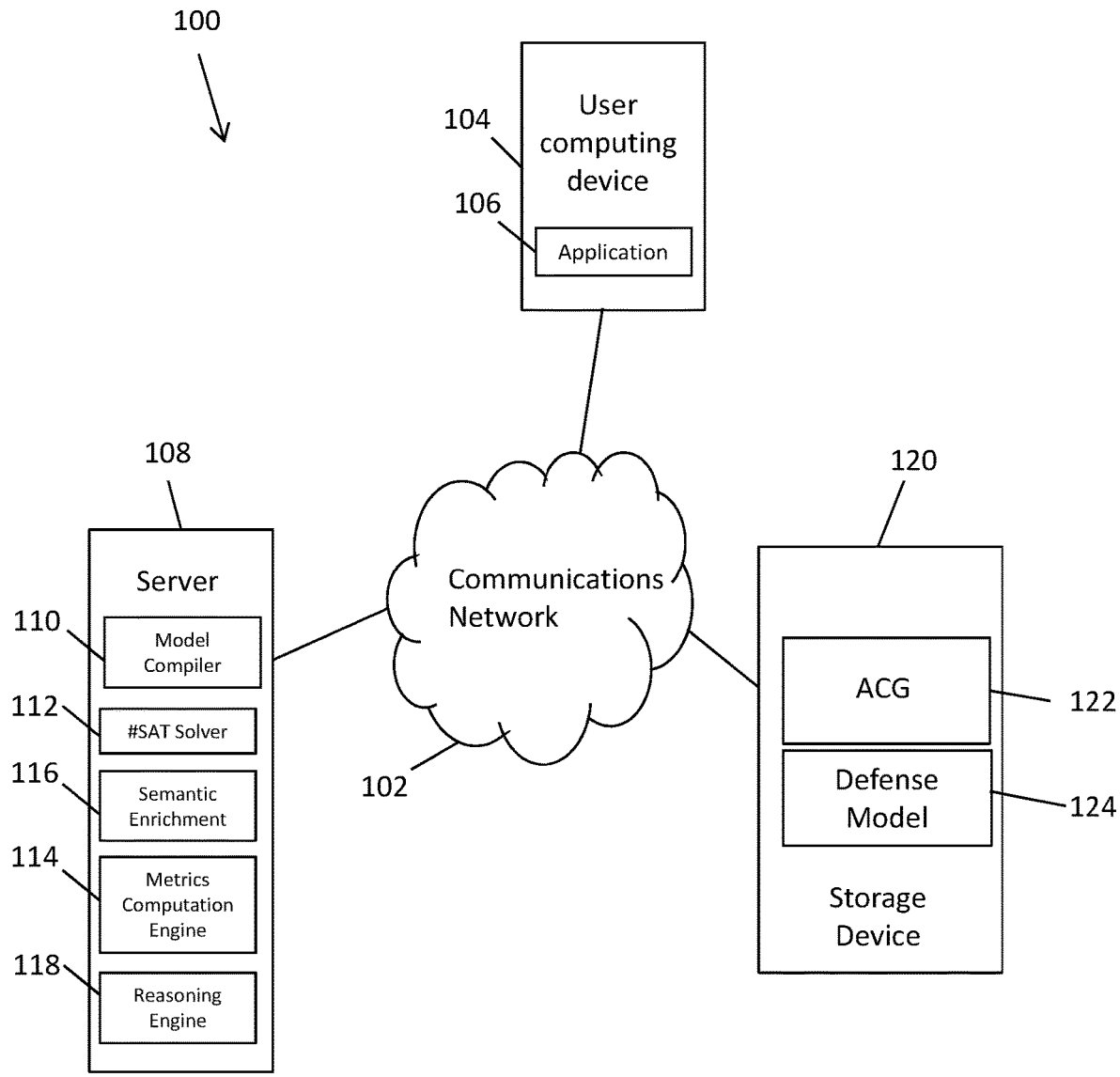
FIG. 1 illustrates a network diagram depicting a system for assessing a computer defense technique, according to an exemplary embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Systems, methods and computer readable medium for quantitatively assessing a computer defense technique are taught. The system includes a memory storing executable instructions to execute a reasoning engine. The reasoning engine receives as an input a query that includes an indicia of a defense technique to a computer security threat. The reasoning engine further translates the defense technique into a propositional logic constraint on a queryable representation of a Boolean formula representing a model complied from a set of computer security threats and a set of defense techniques. The reasoning engine also performs an assessment of the computer defense technique based on the propositional logic constraint on the queryable representation, to quantify the defense technique relative to a member of the set of computer security threats. The reasoning engine displays a result of the assessment to indicate a level of security provided by the defense technique to the member. The system also includes a processor coupled to the memory to execute the executable instructions stored therein to generate as output the result of the query.

Figure 3A:
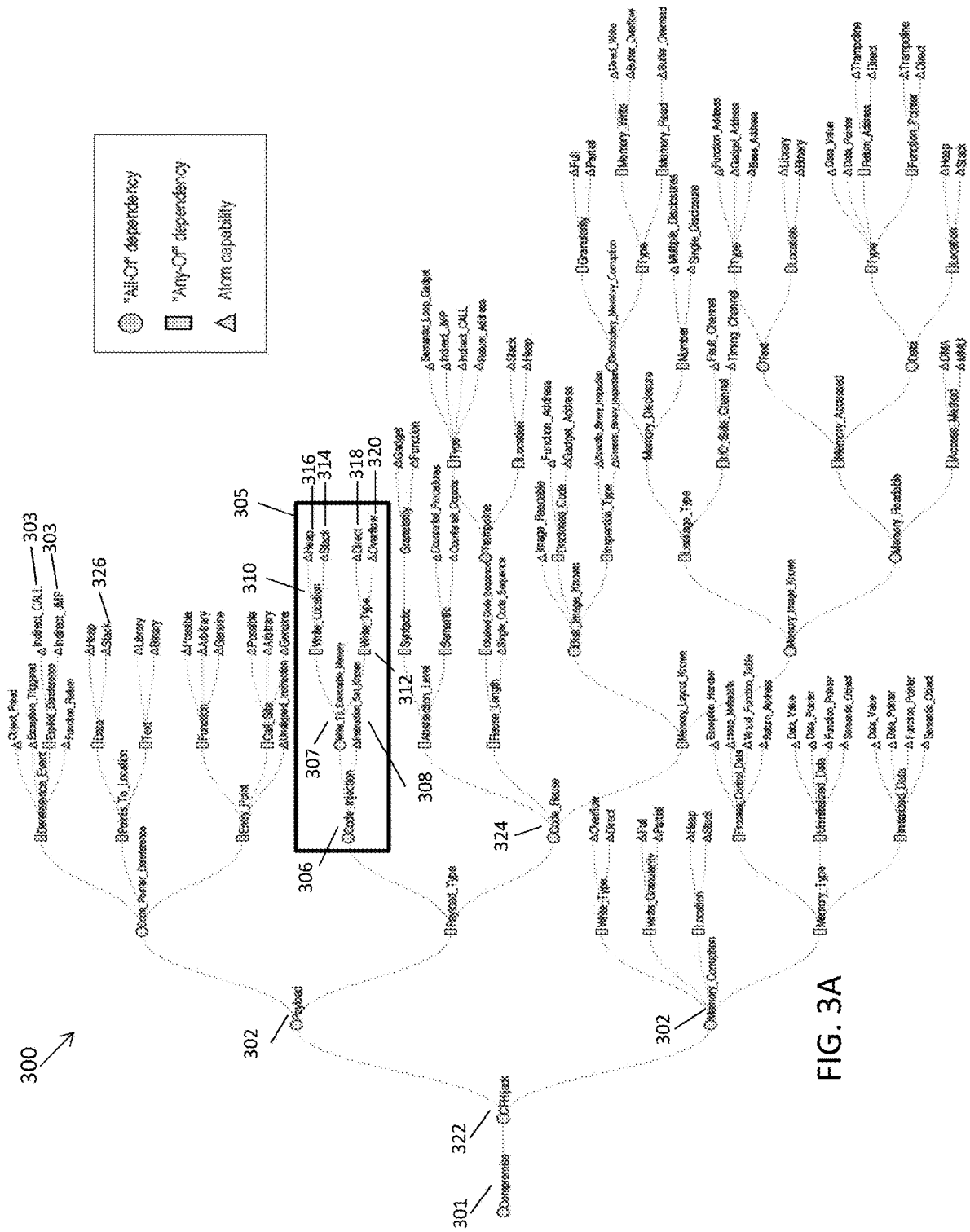
FIG. 3A illustrates an attack capability graph (ACG) for a memory corruption domain, according to an exemplary embodiment.

The rapid cycle of defense techniques and security threats makes it difficult to assess protection offered by a defense technique or coverage provided by a set of defense techniques, and obtain insights into possible new attacks for which to design future defense techniques. The embodiments taught herein analyzes computer security threats and defense techniques at a granularity of the computer attack capabilities necessary to mount attacks. The embodiments can assess a coverage provided by a defense technique or a set of defense techniques, and compare defense techniques. The embodiments can further hypothesize about possible new security threats and attack strategies, identify computer attack capabilities most prevalently used in security threats that currently lack coverage from existing defense techniques, identify security threats that are/are not covered by a set of defense techniques, and/or anticipate new security threats and attack strategies that attackers may begin to employ once effective defense techniques for current security threats are deployed. The described system represents each security threat with a set of fundamental computer attack capabilities necessary for an attacker to successfully carry out an attack. Those computer attack capabilities may themselves rely on other finer-grained capabilities, combined using AND/OR operations in a graph-like structure, referred to as an attack capability graph (ACG), as illustrated in FIG. 3A.

Existing approaches for analyzing computer security threats and defense techniques include low-level frameworks such as attack graphs and high-level frameworks such as risk modeling and simulations. These approaches are often insufficient for strategic assessment and analysis of security threats, defense planning, and defense comparison. For exemplary, attack graphs analyze a network of computers at a granularity of individual software applications and their vulnerabilities. However, the results of such assessment are often valid for a short duration because regular changes in the network, such as (un)installation of an application, discovery of a new vulnerability, and even small modifications to the network topology or reachability, may significantly change or completely invalidate the results. Moreover, attack graphs cannot easily compare various defense techniques since that requires solving the attack graph for different subsets of defense techniques, a problem that quickly becomes intractable as the number of possible defense techniques grows. In comparison, risk modeling and simulation approaches can analyze security threats and defense techniques interaction at a higher granularity, but such approaches usually require quantitative inputs such as attack arrival rates and defensive success probabilities. Such quantitative inputs are often not available or obtainable in a repeatable fashion in practice.

A memory corruption domain is used herein for illustrative purposes. However, the described systems and methods can be used with other security domains, using an ACG and defense techniques associated with a specific security domain.

FIG. 1 illustrates an exemplary network diagram depicting a system 100 for assessing a computer defense technique, according to an exemplary embodiment. System 100 includes a communication network 102, at least one user device 104 including an application 106, at least one server 108, and at least one storage device 120. The server 108 executes a model compiler 110, a # SAT satisfiability solver 112, a semantic enrichment module 116, a metrics computation engine 114, and a reasoning engine 118. The user device 104, the server 108, and the storage device 120 are in communication via the communication network 102. The storage device 120 may include one or more storage devices for storing files and/or data retrievable by server 108, such as one or more ACGs 122, one or more defense models 124, a specially created domain-specific language, and one or more Boolean formulas described herein. Storage device 120 may include a hard-drive, CD-ROM, or other computer readable media, for storing data and computer-readable instructions and/or software, that implements embodiments of the system 100, as described herein, or portions thereof. Storage device 120 and server 108 may be located at one or more geographically distributed locations from each other. Alternatively, storage device 120 may be included within server 108.

In an exemplary embodiment, one or more portions of communication network 102 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other variety of network, or a combination of two or more such networks.

Application 106 enables a user to enter a query to the reasoning engine. The query includes an indicia of a defense technique to a computer security threat. Application 106 further displays a result of an assessment to indicate a level of security provided by the defense technique, as described herein. In an exemplary embodiment, application 106 is used to enter queries and/or view and interact with the user interfaces illustrated in FIGS. 7-11. Application 106 may be associated with or installed on, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Application 106 may connect to network 102 via a wired or wireless connection. Application 106 may include one or more applications such as, but not limited to, a web application and/or a mobile application to enable access to server 108, as described herein.

Server 108 includes one or more computers or processors configured to communicate with application 106 via network 102. Server 108 can include one or more components of computing device 600 of FIG. 6.

Figure 2:
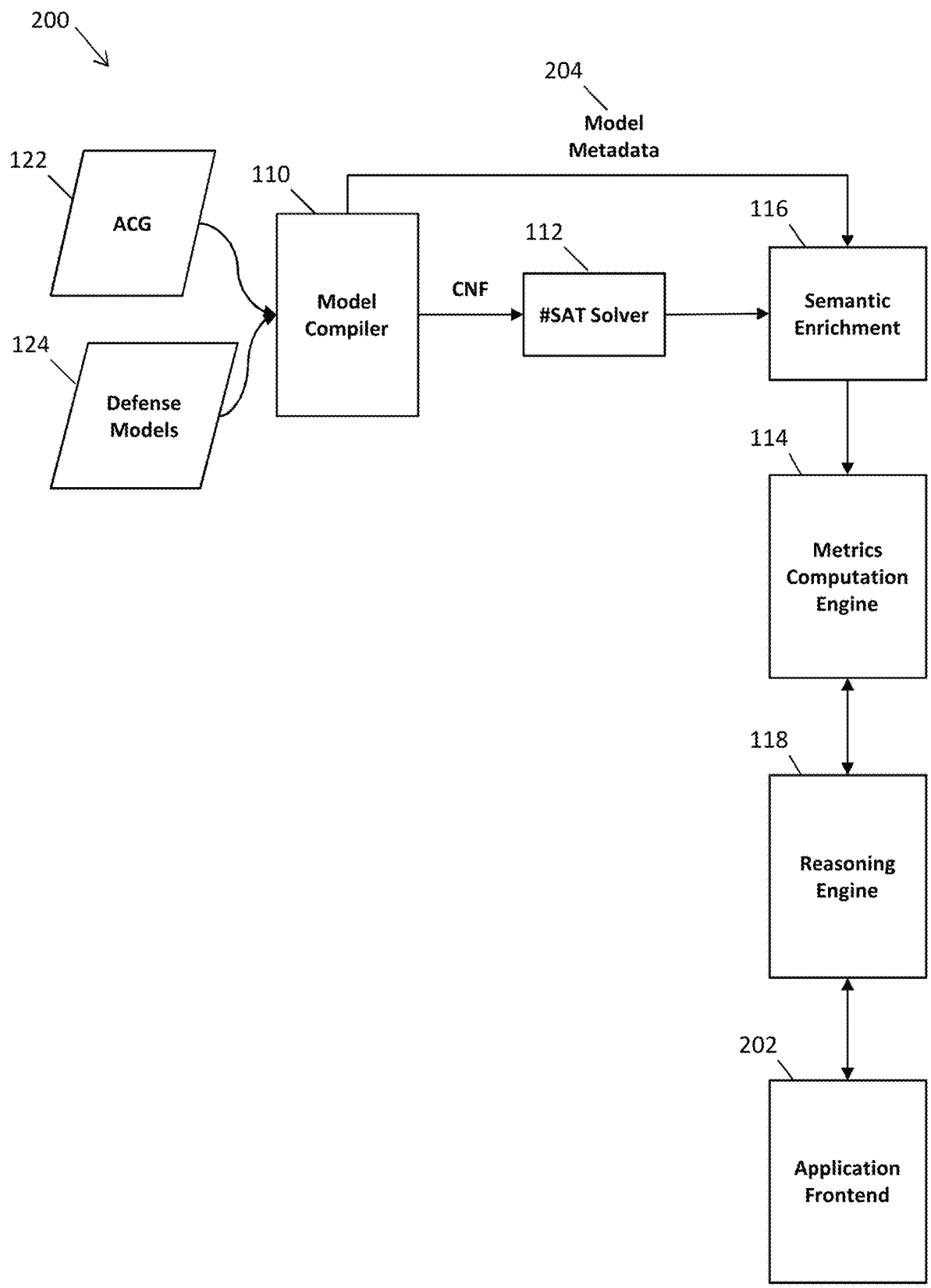
FIG. 2 illustrates an exemplary architecture for assessing a computer defense technique, according to an exemplary embodiment.

FIG. 2 illustrates an exemplary architecture 200 for quantitatively assessing a computer defense technique, according to an exemplary embodiment. The architecture 200 includes the model compiler 110, the # SAT solver 112, the semantic enrichment engine 116, the metrics engine 114, the reasoning engine 118, and an application frontend 202.

The model compiler 110 transforms a model of computer attack capabilities and defense techniques into a Boolean formula. More particularly, the model compiler 202 receives an ACG 102 (for exemplary, ACG 300 discussed in FIG. 3A) and one or more defense models 124 as input. The model compiler 110 converts the defense models 124 and the ACG 102 into a Boolean formula in conjunctive normal form (CNF), as described herein.

The ACG 102 includes computer attack capabilities. The computer attack capabilities are dependency relationships, beginning with a high-level goal and continuing into increasingly-refined sub-goals. Each capability can have either an "All-Of" or "Any Of" relationship with other computer attack capabilities on which it depends, or it can be an atom with no further dependencies. As further described herein, the model compiler 110 receives the ACG 102 and converts each computer attack capability within the ACG 102 to a logical expression of an atom representing the capability to a set of conjoined (for all-of) or disjoined (for any-of) atoms representing dependencies. Defense techniques are expressed in a formal domain specific language which is also converted by the model compiler 110 to a logical expression. Defense techniques constrain the atoms defined by computer attack capabilities. The model compiler 110 conjoins the logical expressions for the computer attack capabilities and the defense techniques into a Boolean formula in CNF.

The # SAT solver 112 converts the Boolean formula in CNF into a queryable representation. The queryable representation is a Boolean formula representing a model complied from a set of computer security threats and a set of defense techniques. In an exemplary embodiment, the queryable representation is a Boolean formula in Smoothed Deterministic Negation Normal Form (SDDNNF). The # SAT solver 112 provides an ability to count formula solutions using the SDDNNF.

The metrics computation engine 114 computes defense coverage metrics to compare defense techniques against one another. As described herein, a defense coverage metric is a proportional measure which compares the number of security threats available when a defense technique is deployed, to those available when no defense techniques are deployed.

The metrics computation engine 114 can further computes attack criticality metrics to compare computer attack capabilities against each other. An attack criticality metric is a per-capability measurement showing what proportion of successful attack strategies rely on a particular computer attack capability being available. As described herein, an attack criticality metric can be used to identify, for some set of defense techniques, the highest-impact computer attack capabilities that can be used against the set of defense techniques.

The semantic enrichment engine 116 uses model metadata 204 to re-introduce attack/defense information lost during the conversion from CNF to SDDNNF. The model metadata 204 tracks whether a Boolean variable represents a defense technique, a computer attack capability, or a temporary variable introduced during compilation for efficiency.

The reasoning engine 118 uses the queryable representation to compute metrics in response to receiving as an input a query that includes an indicia of a defense technique to a computer security threat. The indicia of a defense technique may be a name of the defense technique (e.g., readactor, stack cookies, etc.) or the indicia may be a description of a constraint on a computer attack capability. Queries may include one or more defense techniques and, optionally, one or more computer attack capabilities. The reasoning engine 118 translates the queries associated with the defense techniques and, optionally, the computer attack capabilities into propositional logic constraints on the queryable representation, as described herein. For example, the reasoning engine 118 may receive a query that includes a set of defense techniques.

The reasoning engine 118 performs an assessment of the defense technique based on the propositional logic constraint on the queryable representation, to quantify the defense technique relative to a member of the set of computer security threats. For example, the reasoning engine 118 may determine formula solutions using the queryable representation based on constraints imposed on the computer attack capabilities by the set of defense techniques. For a given query, the reasoning engine 118 may identify computer attack capabilities most prevalently used in security threats that currently lack coverage from existing defense techniques, identify security threats that are/are not covered by a set of defense techniques, and anticipate new security threats that attackers may employ once effective defense techniques for current security threats are deployed. The reasoning engine 118 displays a result of the assessment to indicate a level of security provided by the defense technique to the member. In addition, the reasoning engine 118 may compute several metrics such as defense coverage metrics and attack criticality metrics using the metrics computation engine 114. The metrics enables a user to quantitatively assess coverage provided by a set of defense techniques, as described herein. The assessment and metrics may be displayed via a web application frontend 202.

In some embodiments, the reasoning engine 118 loads the queryable representation into memory and runs as a service, receiving queries from the web application frontend 202 over a shared message passing bus.

Figure 7:
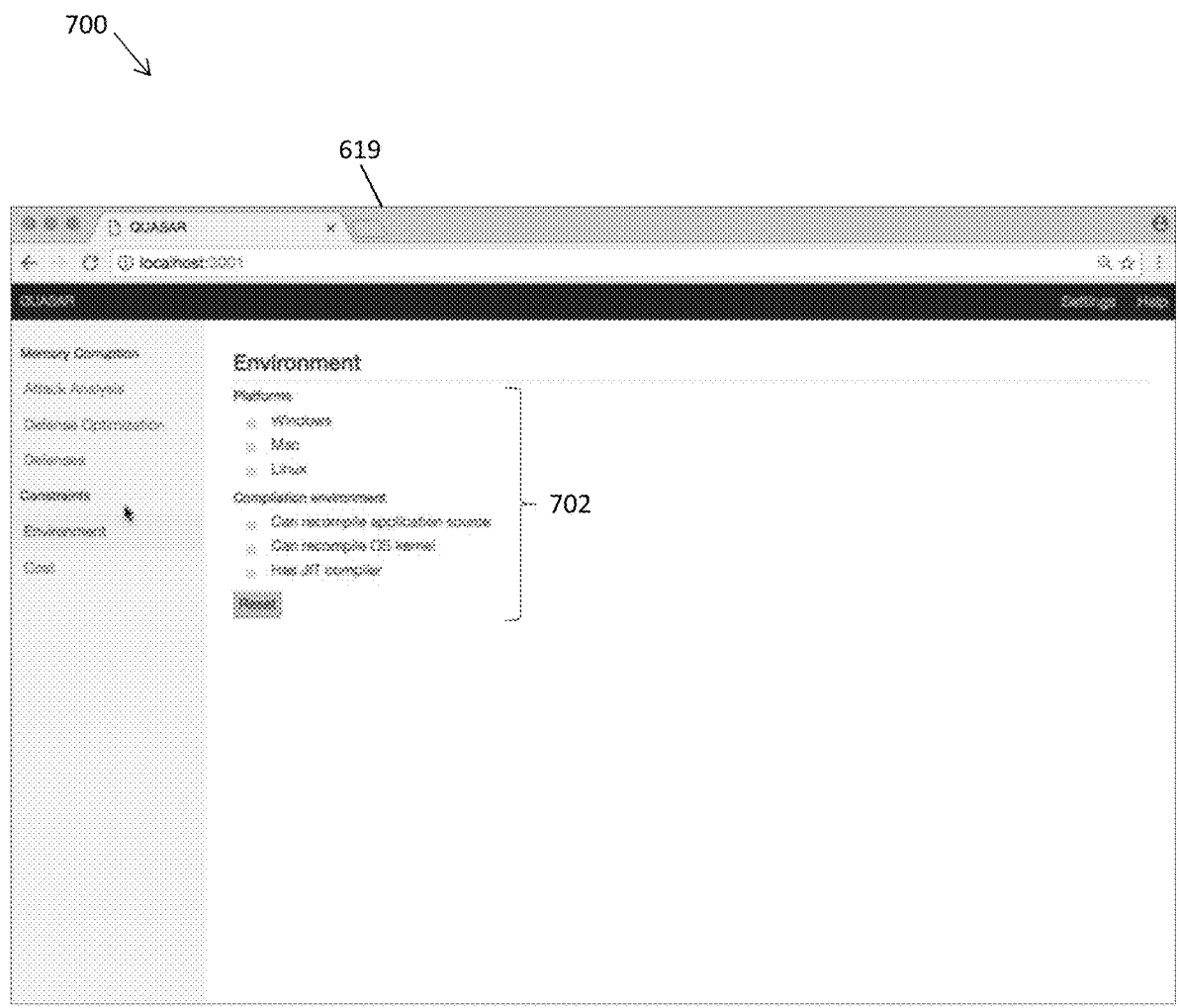
FIG. 7 depicts an exemplary user interface illustrating a webpage showing environment control options, according to an exemplary embodiment.
Figure 8:
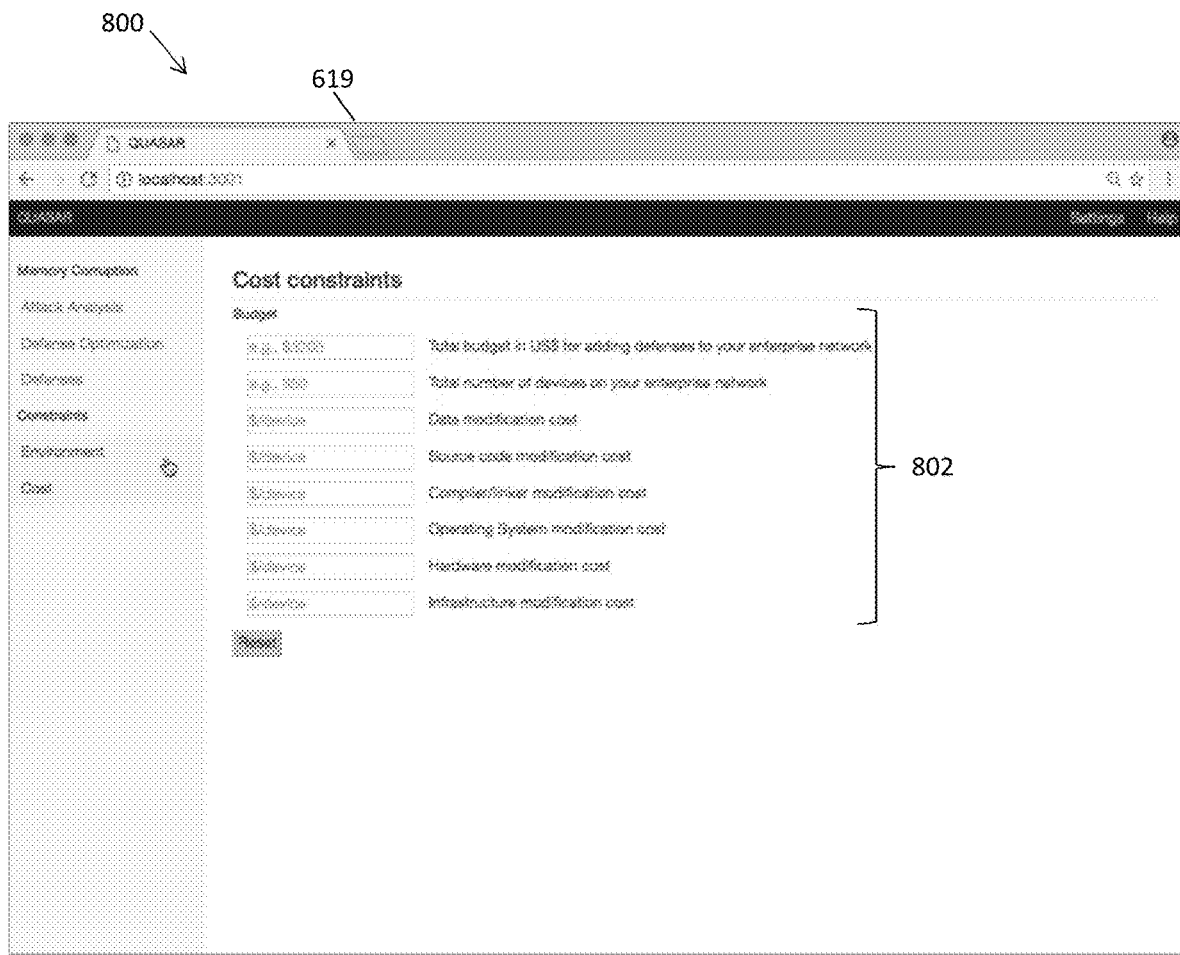
FIG. 8 depicts an exemplary user interface illustrating a webpage with cost constraint options, according to an exemplary embodiment.
Figure 9:
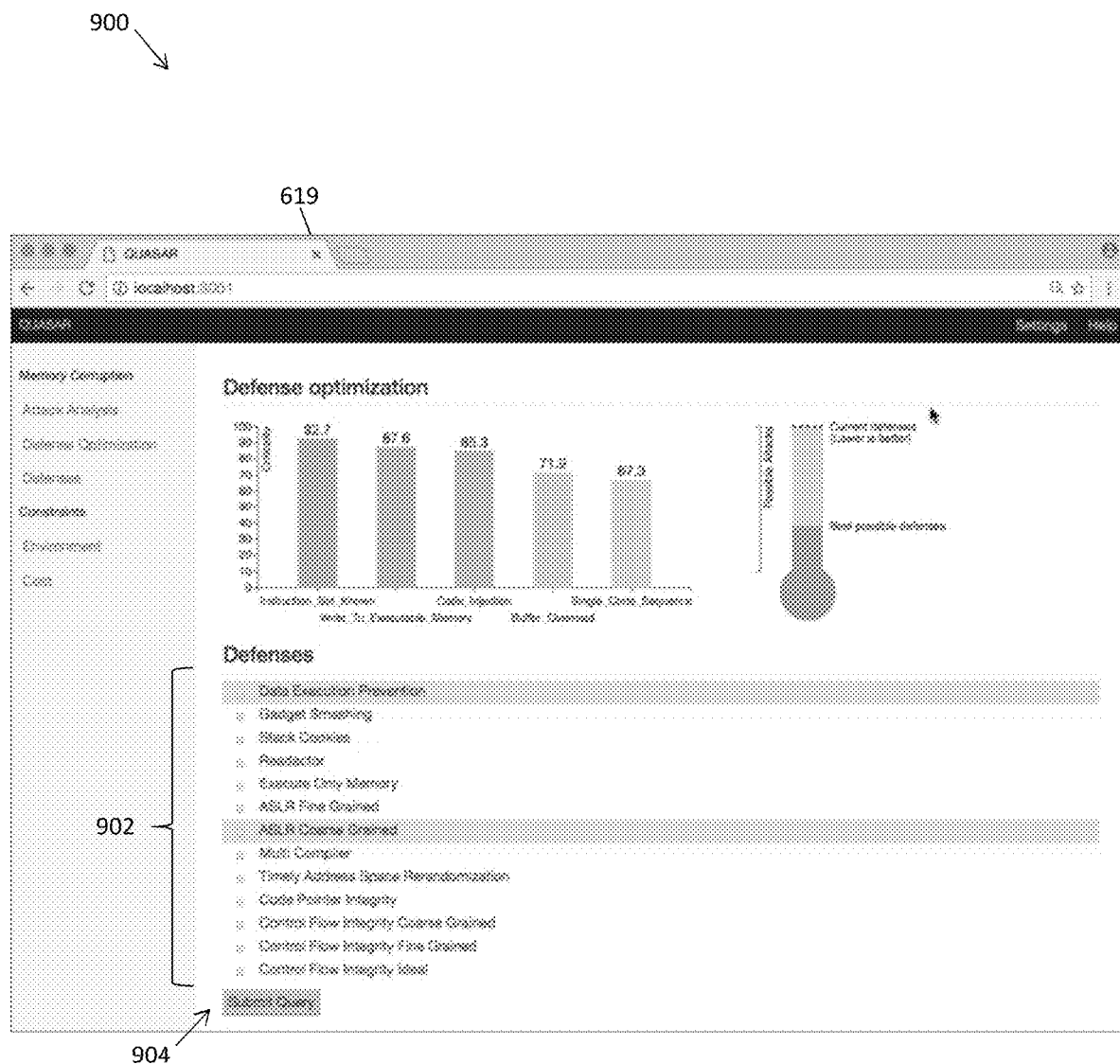
FIG. 9 depicts an exemplary user interface illustrating a webpage for selecting one or more defense techniques for defense optimization and attack analysis, according to an exemplary embodiment.

The web application frontend 202 enables visualization and querying of a graphical user interface, as depicted in FIGS. 7-11. The user interface is a web-based frontend that enables a user to submit a query (which are passed to the reasoning engine 118). In some embodiments, the user may use the user interface to enter cost constraints, as shown in FIG. 8. In further embodiments, the user may use the user interface to select from a list of defense techniques for assessment, as shown in FIG. 9. The query is sent to the reasoning engine 118, as described above. Results of the query are displayed using a variety of visualizations. These include defense coverage metrics and attack criticality metrics, a comparison of defense techniques against other defense techniques, an attack capability graph representing attack criticality metrics, and a chart depicting highest-impact computer attack capabilities given a set of defense techniques. In addition, the web application frontend 202 provides a recommendation mode that enables users to submit queries for a highest-coverage defense technique not currently deployed given a (possibly-empty) set of deployed defense techniques.

FIG. 3A illustrates an attack capability graph (ACG) 300 for a memory corruption domain, according to an exemplary embodiment. The ACG 300 is a model of publicly disclosed computer security threats and their computer attack capabilities from the year 1972 to the year 2017, resulting in 140 fundamental computer attack capabilities. The ACG 300 includes computer attack capabilities an attacker requires to perform a computer attack. Computer attack capabilities are shared across many implementations of security threats. Accordingly, a relatively small number of such computer attack capabilities are needed to fully capture all disclosed security threats. The ACG 300 enables reasoning about large classes of security threats and how defense techniques may impact requirements for a computer attack. This also avoids scalability challenges that arise in finer-grained modeling approaches, such as attack graphs that require solving the attack graph for different and possibly large subsets of defense techniques. As described herein, the ACG 300 is used to generate the queryable representation.

The ACG 300 is a tree-like structure including a root node, child nodes, and leaf nodes representing computer attack capabilities of security threats. The root node (for example, compromise a system 301) is a top node in the tree-like structure. The child nodes (for example, child nodes 302) are directly connected to another node when moving away from the root node to form a hierarchy. The leaf nodes are nodes with no children (for example, leaf nodes 303).

Figure 3B:
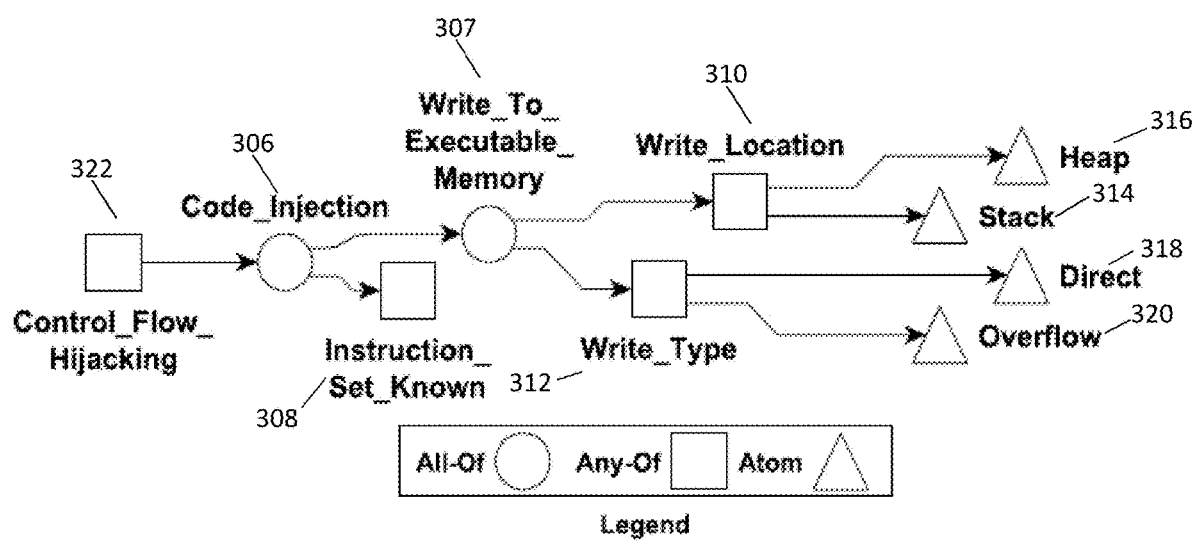
FIG. 3B is a subgraph of the ACG representing a code injection security threat.

Each computer attack capability represents a feature of a target system that must be present in order for an attack to succeed despite the presence of deployed defense techniques. Computer attack capabilities are dependency relationships, beginning with a high-level goal (e.g., "control flow hijacking") and continuing into increasingly-refined sub-goals. Each attack capability can have either an "All-Of" or "Any-Of" relationship with other capabilities on which it depends, or it can be an atom with no further dependencies. For example, section 305, illustrated in FIG. 3B, is a subgraph of the ACG 300, representing a code injection security threat. The top-level goal, Code_Injection 306 has an All-Of relationship with Write_To_Executable_Memory 307 and Instruction_Set_Known 308 capabilities; both dependencies must be satisfied in order for an attacker to be able to use the code injection attack strategy. In other words, Code_Injection 306 requires that (1) the attacker knows the instruction set that is used on a target machine (e.g., Instruction_Set_Known 308), and (2) the attacker has the capability to write to executable memory pages (e.g., Write_To_Executable_Memory 307).

The attack capability Write_To_Executable_Memory 307 has its own dependencies, which must themselves be satisfied. The capability to write to executable memory pages requires (1) a write location (e.g., Write_Location 310), and (2) a write type (e.g., Write_Type 312). Each of these capabilities is in turn subdivided into further and more specific capabilities (e.g., the write location may be a stack 314 or a heap 316, and the write type may be a direct write 318 or an overflow write 320).

Computer attack capabilities that represent the lowest level units of an attack (e.g., Instruction_Set_Known 308, heap 314, stack 316, direct write 318, and overflow write 320) are considered attack atoms and are not dependent on other capabilities. However, such atoms can be extended with new requirements if a new subdivision in computer attack capabilities or defense techniques is identified. In addition to extending atoms, the ACG 300 can be further expanded by adding new high-level capabilities and dependencies. CFHjack (Control-Flow Hijacking) 322, for example, can also be accomplished via Code_Reuse 324. A dependency model can be added to the existing Any-Of dependency for Code_Reuse 324, and form a new subgraph of the larger ACG 300.

The ACG 300 representation is a logical formulation of computer attack capabilities that is amenable to automated analysis by the metrics computation engine 114 and the reasoning engine 118. Formally, an attack capability is defined as a propositional logic formula with one of the following structures:

All-Of: $a_n \rightarrow (a_i \wedge \ldots \wedge a_j)$
Any-Of: $a_n \rightarrow (a_i \vee \ldots \vee a_j)$
Atom: $a_n$ Where $a_n$ is a name of the attack capability and $a_i \ldots a_j$ are computer attack capabilities on which $a_n$ depends. The atom $a_n$ may be constrained by defense technique(s), and is available if its dependencies (if any) are met.

FIG. 3C illustrates the ACG 300 represented as a unified attack capability model 330, according to an exemplary embodiment. The unified attack capability model 330 includes a Boolean formula $\Phi_{atk}$. The model compiler 110 creates the Boolean formula $\Phi_{atk}$ by translating the computer attack capabilities in the ACG 300 into the Boolean formula $\Phi_{atk}$. In the unified attack capability model 330, A is a set of the computer attack capabilities, $X_{atk}$ is the attack capability graph shown in FIG. 3A, and $a_g$ is the top-level goal of the attack capability graph.

The formula $\Phi_{atk}$ is satisfiable if there exists a set of computer attack capabilities that permit the top-level goal $a_g$ to satisfy all of its dependencies. Thus, every solution to the formula is a unique security threat (also known as an attack method), by virtue of being a unique set of truth values that satisfy the formula and make $a_g$ achievable by an attacker.

A defense technique is a constraint or a set of constraints on one or more computer attack capabilities that disables the one or more computer attack capabilities. Accordingly, the defense technique serves to constrain an attacker's ability to use the one or more computer attack capabilities. For example, stack canaries place a constraint on the code injection subgraph that prevents the simultaneous usage of overflowing (for the write type) and stack (for the write location). However, with the stack canaries, other combination of computer attack capabilities such as direct writing to stack are still possible.

In an exemplary embodiment, defense models are created using the domain-specific language compatible with the model compiler 110. The model compiler 110 translates the defense models written in the domain-specific language into Boolean formulas, as described herein. The defense models represent twenty well-known memory protection defense techniques, including control-flow integrity, code pointer integrity, readactor, timely address space randomization (TASR), binary stirring, instruction layout randomization (ILR), as well as widely deployed defenses such as data execution prevention (DEP), stack canaries, and address space layout randomization (ASLR). In other embodiments, the defense models may include more or less defense techniques, depending on the domain.

In general, the defenses techniques are encoded in a manner similar to the computer attack capabilities. The defense techniques are translated into Boolean formulas by the model compiler 110 using a series of steps similar to the steps used to translate the computer attack capabilities (e.g., conjoining each individual defense technique into a unified formula representing the defense techniques). However, where the computer attack capabilities must be attack atoms or have dependencies on other computer attack capabilities, a defense technique can constrain computer attack capabilities without reliance on other defense techniques. For example, Data Execution Prevention (DEP) constrains an attacker's ability to write to executable memory. DEP is encoded to assure that the attack capability Write_To_Executable_Memory 307 is disabled as far as any upstream capabilities are concerned, regardless of whether the dependencies of Write_To_Executable_Memory 307 are satisfied.

A defense technique is formalized as a logical formula of the following structure:

$$d_n \wedge \Phi_r \rightarrow \Phi_a,$$

where $d_n$ is a name of the defense technique, $\Phi_r$ is a requirement that the defense technique has over some set of system environment atoms, such as being limited to deployment on certain platforms (e.g., Linux vs. Windows), and $\Phi_a$ is the constraint imposed by the defense technique on one or more computer attack capabilities ($\Phi_a$ may be an arbitrary logical constraint, and is not limited to simple negation). This formula denotes the logical structure of a defense technique written in the domain-specific language, after the model compiler 110 converts the domain-specific language to a Boolean formula. The model compiler 110 uses the formula during translation. Notably, the constraint the defense technique imposes over one or more attach capabilities is enforced if $d_n$ is asserted.

The described structure for the defense technique has two useful properties. First, defense techniques can be added to the defense model without actually deploying them (i.e., enforcing their constraint). This is useful, as it decouples model creation from model querying. That is, the metrics computation engine 114 and the reasoning engine 118 can efficiently count formula solutions (and thus the number of viable security threats) for any combination of defense techniques, which need not be chosen in advance at model compilation time.

Second, defense techniques impose constraints over computer attack capabilities. For example, coarse-grained control-flow integrity does not directly remove computer attack capabilities but rather limits their combination by imposing a restriction such that dereferencing of a return address goes to a call site, and dereferencing an indirect branch goes to a function prologue.

The model compiler 110 uses a specially-created domain-specific language to encode defense techniques and express constraints of defense techniques more compactly than by using Boolean expressions over computer attack capabilities. FIG. 3D illustrates a domain-specific language 340 for a coarse-grained control flow integrity.

The domain-specific language incorporates postfix-matched names. The postfix-matched names serves to disambiguate computer attack capabilities which may have the same name. For example, stack appears in several locations of the attack capability graph (e.g., stack 314 and stack 326) with different contexts and semantics. Rather than demand unique names, defense techniques can specify which capability is constrained by post-fixing it with a chain of its parents, separated by dots. For example, Function_Return.Dereference_Event refers to the Function_Return attack capability with Dereference_Event as its parent. The model compiler 110 does not compile if ambiguity is present, which must be resolved by extending the length of the postfix until it is unique.

The domain-specific language further incorporates two set operations, intersection and complement, over children of a computer attack capability. Each computer attack capability that is a root node or a child node can be described as a name of a set whose members are its children. The set operations enable a defense technique to more clearly and easily identify members of a computer attack capability that are constrained by the defense technique. For example, (Entry_Point.Code_Pointer_Dereference I Call_Site.Entry_Point)) refers to the Entry_Point set, which denotes means by which a code pointer de-reference can point to an entry point to a code region. The members of Entry_Point are Function, Call_Site, and Unaligned_Instruction. The intersection of Entry_Point with Call_Site restricts an attacker from using any other entry point but a call site.

The above notation enables defense techniques to avoid explicitly listing which alternatives they restrict. It allows more terse, readable defense techniques, as well as assisting in insulating defense techniques from needing to be rewritten if the ACG 300 is updated to include another alternative in an already-restricted set.

The model compiler 110 compiles the domain-specific language expressing the constraints into a full Boolean formula. Once the defense techniques have been defined by the domain-specific language, the model compiler 110 conjoins the domain-specific language into a single Boolean formula, $\Phi_{def}$, depicted in FIG. 3E.

Representing defense techniques as logical constraints on computer attack capabilities is a useful way to identify comparable or equivalent defense techniques. For example, two anti-return-oriented programming (anti-ROP) defenses are ILR and Binary Stirring. ILR is a virtualization-based defense technique which randomizes instruction locations in a process. Binary Stirring is a loader-based defense technique which reorders and re-writes native code to be semantically equivalent on a basic block level. Each of these defense techniques rely on very different mechanisms, working at varying levels of abstraction and varying points in a program's lifecycle. However, when distilled to the constraints that they impose on computer attack capabilities, the reasoning engine 118, for example, may determine that the defense techniques are logically equivalent. That is, the defense techniques apply when the memory layout is not known to an attacker. In that case, the defense techniques prevent the attacker from using syntactic (i.e., ROP) gadgets.

By modeling defense techniques at this level, the reasoning engine 118 is able to identify comparable or logically equivalent defense techniques. This enables, for example, identification of common threat model assumptions (e.g., the attackers not knowing the memory layout) that might indicate a shared point of weakness across several defense techniques. It further assists in identifying and preventing the development or deployment of a defense technique that provides no added protection beyond already existing defense techniques.

FIG. 3E illustrates a Boolean formula $\Phi_{full}$ representing the defense techniques and security threats, according to an exemplary embodiment. Once the defense techniques have been defined, they are conjoined by the model compiler 110 into the Boolean formula $\Phi_{def}$. The model compiler 110 conjoins the Boolean formula $\Phi_{def}$ and the Boolean formula $\Phi_{atk}$ into the Boolean formula $\Phi_{full}$ in conjunctive normal form (CNF).

The Boolean formula $\Phi_{full}$ represents the model of defense techniques and security threats where every solution to the formula $\Phi_{full}$ constitutes a successful security threat, and every successful security threat constitutes a solution to the formula. Thus, the metrics computation engine 114 and the reasoning engine 118 are able to count formula solutions to determine a number of security threats. Furthermore, defense techniques are not explicitly enabled. As logical implications, the constraint they impose on a selection of computer attack capabilities are enforced if the defense technique itself is asserted. The metrics computation engine 114 and the reasoning engine 118 may perform quantitative reasoning about how many unique security threats are possible in presence of a specific defense technique, or set of defense techniques, based on a number of solutions to the formula that can be counted given some set of defense literals that are enabled or disabled.

Calculations in a large model become intractable because an NP-hard problem must be solved an exponential number of times. Accordingly, the # SAT satisfiability solver 112 leverages a # SAT solver, or propositional model counting, that can count formula solutions without repeatedly solving the full satisfiability problem. In an exemplary embodiment, the # SAT satisfiability solver 112 is a C2D # SAT solver, which transforms the Boolean formula ($\Phi_{full}$) into an representation known as Smoothed Deterministic Negation Normal Form (SDDNNF). The SDDNNF is a queryable representation that can queried using the metrics computation engine 114 and the reasoning engine 118. At a high level, the solutions to the Boolean formula correspond to successful security threats. By counting the number of solutions in the presence of specific defense techniques, the metrics computation engine 114 and the reasoning engine 118 can generate metrics that enable defense techniques to be quantitatively analyzed and compared.

Despite having approximately 500 variables covering computer attack capabilities and defense techniques, compilation times for converting the attack capabilities and defense techniques into the SDDNNF did not exceed 500 ms on a 2.1 GHz Intel Xeon processor with 32 GB of RAM. Representing the computer attack capabilities and defense techniques as a Boolean formula in SDDNNF has several useful properties. First, although the compilation is itself NP-Hard, queries against the SDDNNF are performed as linear-time graph traversals. Furthermore, because the graph is polynomial with respect to number of variables in the input formula, the compilation is performed upon model creation or modification, rather than during the solution counting phase.

The metrics computation engine 114 and the reasoning engine 118 can use the SDDNNF to implement solution counting. In an exemplary embodiment, solution counting is implemented as a solution counting function G(S), where G is the solution counting function that takes a constraint set as a parameter S, and returns the solution count under those constraints. Constraints in this context are a set of truth values for atoms in the formula. This can be used by the metrics computation engine 114 and the reasoning engine 118 to conduct an analysis of security threats conditioned on a specific set of defense techniques being asserted (i.e., deployed) and all others negated, and to compare defense techniques by measuring their coverage over a space of security threats.

The metrics computation engine 114 and the reasoning engine 118 can further use can compute the partial derivative of the solution counting function with respect to each atom of the formula. This enables the metrics computation engine 114 and the reasoning engine 118 to compute, for every atom, the number of solutions when that atom is either asserted or negated. Computation for each atom can be done simultaneously, in a second linear time graph traversal. The metrics computation engine 114 and the reasoning engine 118 can further use this capability to identify future high-impact computer attack capabilities.

FIG. 4A illustrates a formula 400 for determining a defense coverage metric, according to an exemplary embodiment. Once in SDDNNF, the metrics computation engine 114 may compute quantitative defense coverage metrics to compare defense techniques against one another based on a degree to which each defense technique constrains computer attack capabilities. As defense techniques are represented as logical constraints over computer attack capabilities, these constraints limit what computer attack capabilities can be simultaneously selected as part of a security threat. The metrics computation engine 114 counts how many distinct security threats are possible in the presence of a deployed defense technique, and computes a measurement of that defense technique's defense coverage over the space of the security threats. Specifically, for each defense technique in the model, the metrics computation engine 114 can compute the defense coverage metric using the formula 400, where D is the set of literals corresponding to the defense techniques included in the model, G is a solution counting function which takes a set of constraints and returns the number of formula solutions under those constraints, $S_d=\{d\}\cup\{\neg d'\in D|d'\neq d\}$ is a constraint set in which the defense technique d is enabled and all other defense techniques are disabled, and $S_{of}=\{\neg d'\in\}$ is a constraint set in which all defense techniques are disabled.

The defense coverage metric is a proportional measure that compares a number of security threats available when a specific defense technique is deployed, to those available when no defense techniques are deployed. This is normalized to be in the [0,1] interval, where a higher measurement corresponds to higher coverage, meaning a lower number of successful attacks resulting from security threats. With respect to the model of defense techniques and computer attack capabilities, coverage did not exceed approximately 0.4 for any single existing defense technique. This is because no single defense technique can stop the majority of security threats. The approach used to compare single defense techniques can also be used to compare sets of defense techniques against each other by enabling them in $S_d$.

For example, defense coverage metrics for two memory corruption defense techniques, Readactor and Stack Cookies, are shown in a table 405 in FIG. 4B. The constraints imposed on the computer attack capabilities for each defense technique are shown in FIG. 4B, as are their defensive coverages. Readactor is a memory corruption defense technique that relies on fine-grained randomization and nonexecutable memory. With respect to the computer attack capabilities, Readactor constrains security threats such that: (1) the text segment of a process is unreadable to an attacker, (2) the victim's memory image must be known (i.e., an attacker's local copy cannot be used to identify gadget locations, where the gadget is a series of machine instructions terminating in a ret or ret-like sequence), (3) the indirect branches are trampolines where execution jumps into a memory location and then immediately jumps out (rather than direct pointers to the branch target), and (4) code reuse on the semantic level cannot rely on counterfeit object-oriented programming. Due to constraining many computer attack capabilities, often forcing the attacker to alternative attacks that rely on complex dependencies, Readactor provides a high defense coverage metric. Attacks are still possible, but are generally restricted to those with many complex dependencies or that rely on multi-stage attacks.

In comparison, stack canaries protect against buffer overflows on a stack, assuming no memory disclosures are present. This is captured in the defense constraint. If the memory layout of the victim is unknown, and memory corruption happens via an overflow on the stack, then the attacker's corruption of process control data cannot include a corruption of return addresses. This is a weaker constraint than Readactor, as shown when comparing their respective defense coverage metrics in FIG. 4B.

The metrics computation engine 114 can further computes attack criticality metrics using the formula 420 shown in FIG. 4C. The formula 420 is used to compare computer attack capabilities against each other, where A is a set of the computer attack capabilities, G is the solution counting function which takes a set of constraints and returns a number of formula solutions under those constraints, and D is a constraint set denoting enabled defense techniques. The reasoning behind an attack criticality metric is that for a given set of deployed defense techniques, there is a set of security threats that succeed despite the presence of the defenses techniques. These security threats rely upon specific computer attack capabilities, and some of those computer attack capabilities may be leveraged more than others. Thus, the attack criticality metric is a per-capability measurement showing what proportion of successful security threats rely on an attack capability being available.

Computing the partial derivative of G(D) with respect to attack capability a returns two values: a number of solutions when a is enabled and a number of solutions when a is disabled. When a is enabled, that means that a is used by security threats. The number of solutions when a is enabled is divided by the total number of security threats given the deployed defenses, creating a proportional attack criticality metric in the [0, 1] interval. A high attack criticality metric indicates computer attack capabilities which are used by many security threats, as well as those that have few of their own dependencies and are thus more generalizable. A lower attack criticality metric indicates computer attack capabilities that are blocked or limited by deployed defense techniques, as well as those computer attack capabilities which have a large number of required dependencies. An example of attack criticality metrics for a set of computer attack capabilities is shown in a table 425 in FIG. 4D.

The metrics computation engine 114 can use attack criticality metrics to identify, for some set of deployed defense techniques, the highest-impact computer attack capabilities that can be used against the set of deployed defense techniques. That is, these are the areas where attackers are most incentivized to focus their attacks, and thus in turn where defense planners and researchers should prioritize mitigations.

Figure 5A:
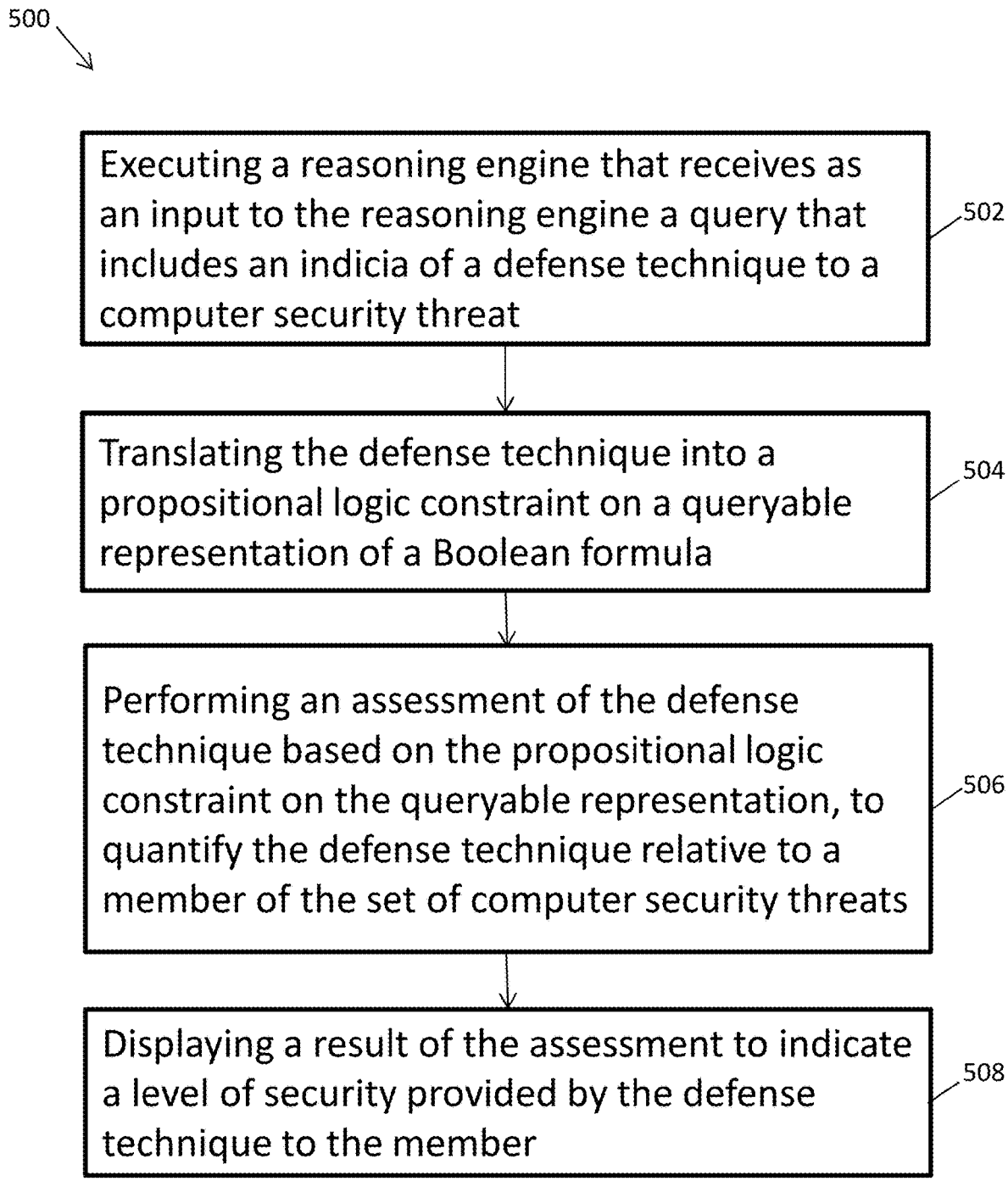
FIG. 5A is a flowchart illustrating a computer-implemented method for assessing a defense technique, according to an exemplary embodiment.

FIG. 5A is a computer-implemented method 500 for assessing a defense technique, according to an exemplary embodiment. At step 502, the method includes executing a reasoning engine (e.g., reasoning engine 118) that receives as an input to the reasoning engine a query that includes an indicia of a defense technique to a computer security threat. At step 504, the reasoning engine translates the defense technique into a propositional logic constraint on a queryable representation of a Boolean formula representing a model complied from a set of computer security threats and a set of defense techniques. At step 506, the reasoning engine performs an assessment of the defense technique based on the propositional logic constraint on the queryable representation, to quantify the defense technique relative to a member of the set of computer security threats. At step 508, the reasoning engine displays, on a graphical user interface, a result of the assessment to indicate a level of security provided by the defense technique to the member.

Figure 5B:
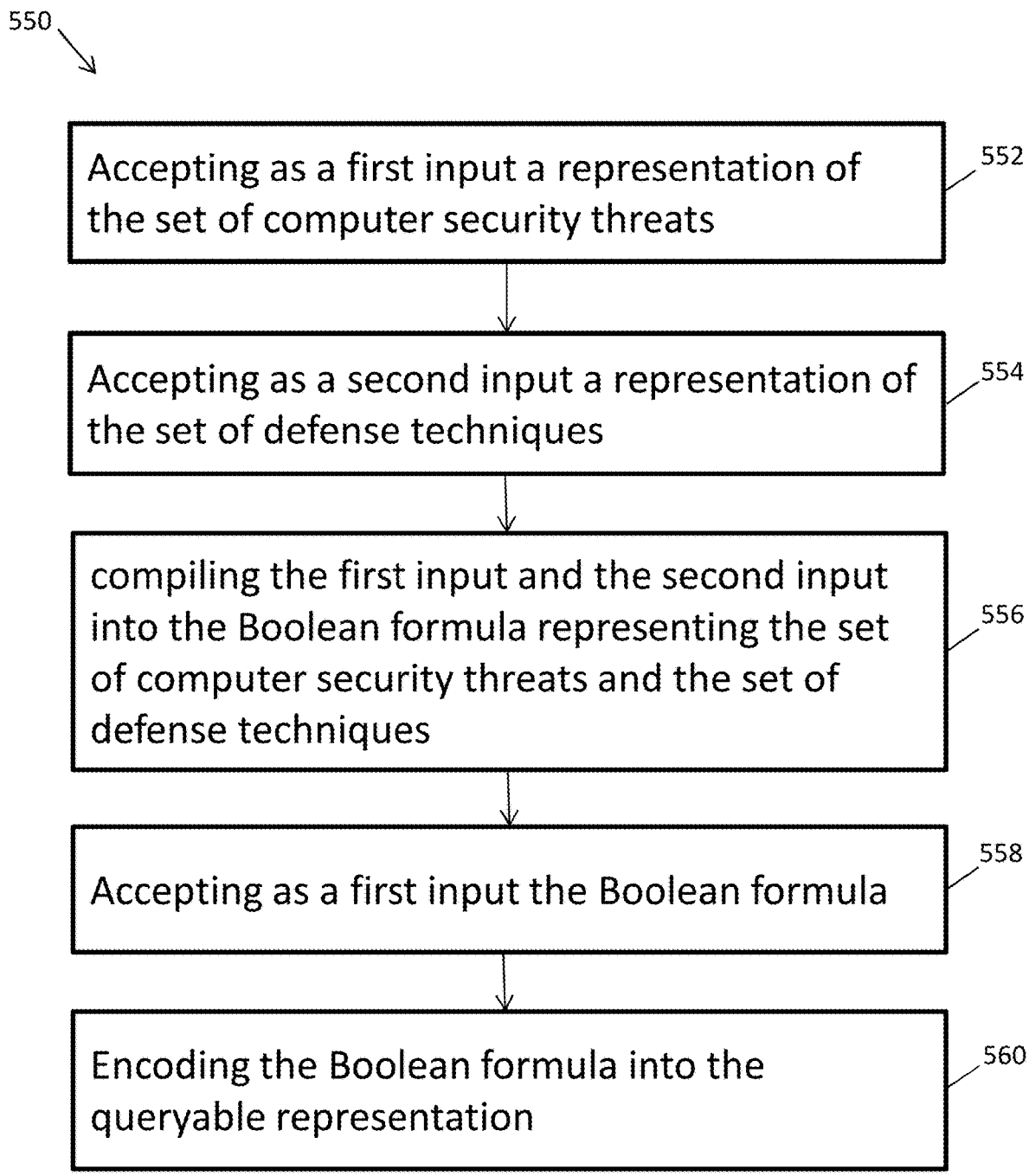
FIG. 5B is a flowchart illustrating a computer-implemented method for creating a queryable representation used in assessing a defense technique, according to an exemplary embodiment.

FIG. 5B is a computer-implemented method 550 for creating a queryable representation used in assessing a defense technique, according to an exemplary embodiment. At step 552, a model compiler (e.g. model compiler 202) accepts as a first input a representation of the set of computer security threats. At step 554, the model compiler accepts as a second input a representation of the set of defense techniques. At step 556, the model compiler compiles the first input and the second input into the Boolean formula representing the set of computer security threats and the set of defense techniques. At step 558, a # SAT solver (e.g. # SAT solver 112) accepts as a first input the Boolean formula. At step 560, the # SAT solver encodes the Boolean formula into the queryable representation. In an exemplary embodiment, the queryable representation of the Boolean formula is in smoothed deterministic decomposable negation normal form stored in a memory.

Figure 6:
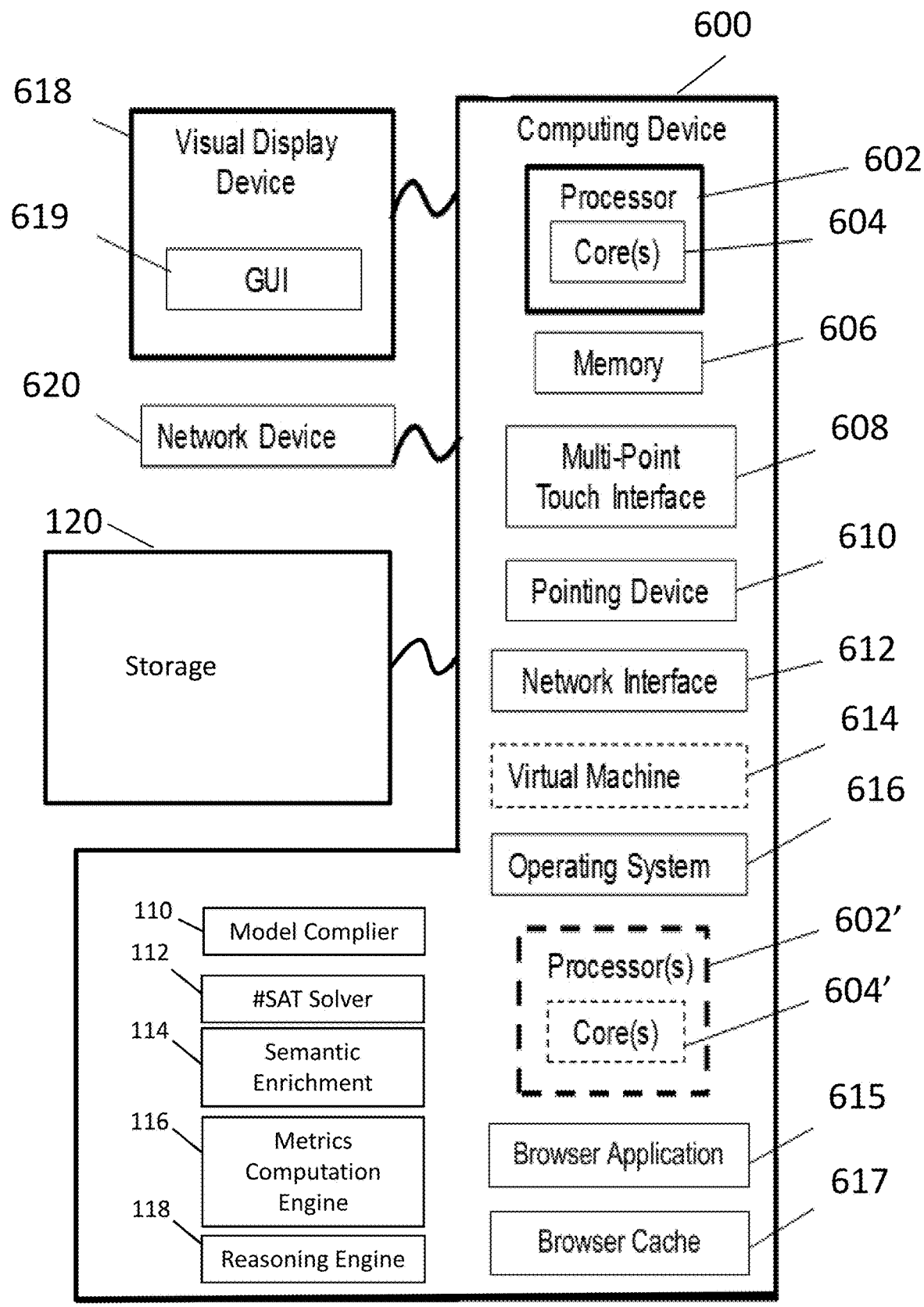
FIG. 6 is a block diagram of an exemplary computing device suitable for use in an embodiment.

FIG. 6 is a block diagram of an exemplary computing device 600 that can be used to perform one or more steps of the methods provided by exemplary embodiments. In an exemplary embodiment, computing device 600 is the server 108 shown in FIG. 1. In another embodiment, visual display device 618 is user computing device 104 shown in FIG. 1. Computing device 600 includes one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flashdrives), and the like. For example, a memory 606 included in computing device 600 can store computer-readable and computer-executable instructions or software for implementing exemplary embodiments. Computing device 600 also includes a processor 602 and an associated core 604, and optionally, one or more additional processor(s) 602' and associated core(s) 604' (for example, in the case of computer systems having multiple processors/cores), for executing computer-readable and computer-executable instructions or software stored in memory 606 and other programs for controlling system hardware. Processor 602 and processor(s) 602' can each be a single core processor or multiple core (604 and 604') processor.

Computing device 600 may include a browser application 615 and a browser cache 617. As described above, browser application 615 can enable a user to interact with the web application frontend 402.

Virtualization can be employed in computing device 600 so that infrastructure and resources in the computing device can be shared dynamically. A virtual machine 614 can be provided to handle a process running on multiple processors so that the process appears to be using one computing resource rather than multiple computing resources. Multiple virtual machines can also be used with one processor.

Memory 606 can include a computer system memory or random access memory, such as DRAM, SRAM, EDO RAM, and the like. Memory 606 can include other varieties of memory as well, or combinations thereof. In some embodiments, a user can interact with computing device 600 through a visual display device 618, such as a touch screen display or computer monitor, which can display one or more user interfaces 619 that can be provided in accordance with exemplary embodiments, for example, the exemplary user interfaces shown in FIGS. 7-17. Visual display device 618 may also display other aspects, elements and/or information or data associated with exemplary embodiments. Computing device 600 may include other I/O devices for receiving input from a user, for example, a keyboard or any suitable multi-point touch interface 608, a pointing device 610 (e.g., a pen, stylus, mouse, or trackpad). The keyboard 608 and pointing device 610 may be coupled to visual display device 618. Computing device 600 may include other suitable conventional I/O peripherals.

Computing device 600 can also include one or more storage devices 120, such as a hard-drive, CD-ROM, or other computer readable media, for storing data and computer-readable instructions and/or software, that implements embodiments of the system, as described herein, or portions thereof. Exemplary storage device 120 may hold ACG(s) 122, defense model(s) 124, Boolean formulas, and other information. Exemplary storage device 120 can also store one or more storage devices for storing any suitable information required to implement exemplary embodiments.

Computing device 600 can include a network interface 612 configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing computing device 600 to any variety of network capable of communication and performing the operations described herein. Moreover, computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

Computing device 600 can further include the model compiler 110, the satisfiability solver 112, the semantic enrichment module 116, the metrics computation engine 114, and the reasoning engine 118.

FIG. 7 depicts the exemplary user interface 619 illustrating a webpage 700 showing an exemplary environment control options menu, according to an exemplary embodiment. The webpage 700 includes various options 702 for selecting an environment for assessing the computer defense technique(s), as described herein. In an exemplary embodiment, the environment includes selecting a platform, e.g., Windows, Mac, and Linux, and a compilation environment, e.g., can recompile application source, can recompile OS kernel, has JIT compiler, etc. Selection of the platform and the compilation environment may affect certain computer attack capabilities and defense techniques. For example, certain security threats can exploit the behavior of JIT compilation. Other options may include a presence of legacy code that cannot be randomized, or a use of embedded systems lacking virtual memory.

FIG. 8 depicts the exemplary user interface 619 illustrating an webpage 800 showing a cost constraints menu, according to an exemplary embodiment. The webpage 800 includes fields 802 for entering a budget and costs associated with implementing network defense techniques to computer attack capabilities. Exemplary costs include data modification cost, source code modification cost, compiler/linker modification cost, operating system modification cost, hardware modification cost, and infrastructure modification. The cost constraints may constrain what defense techniques may be implemented, and consequently shown for selection, as shown in FIG. 9.

FIG. 9 depicts the exemplary user interface 619 illustrating an exemplary webpage 900 for selecting defense techniques for assessment, according to an exemplary embodiment. The webpage 900 enables an user to select one or more defense techniques 902, and submit a query 904 to view a defense optimization and attack analysis associated with the one or more selected defense techniques. As shown in FIG. 9, no defenses are selected and the network has poor defense optimization.

Figure 10:
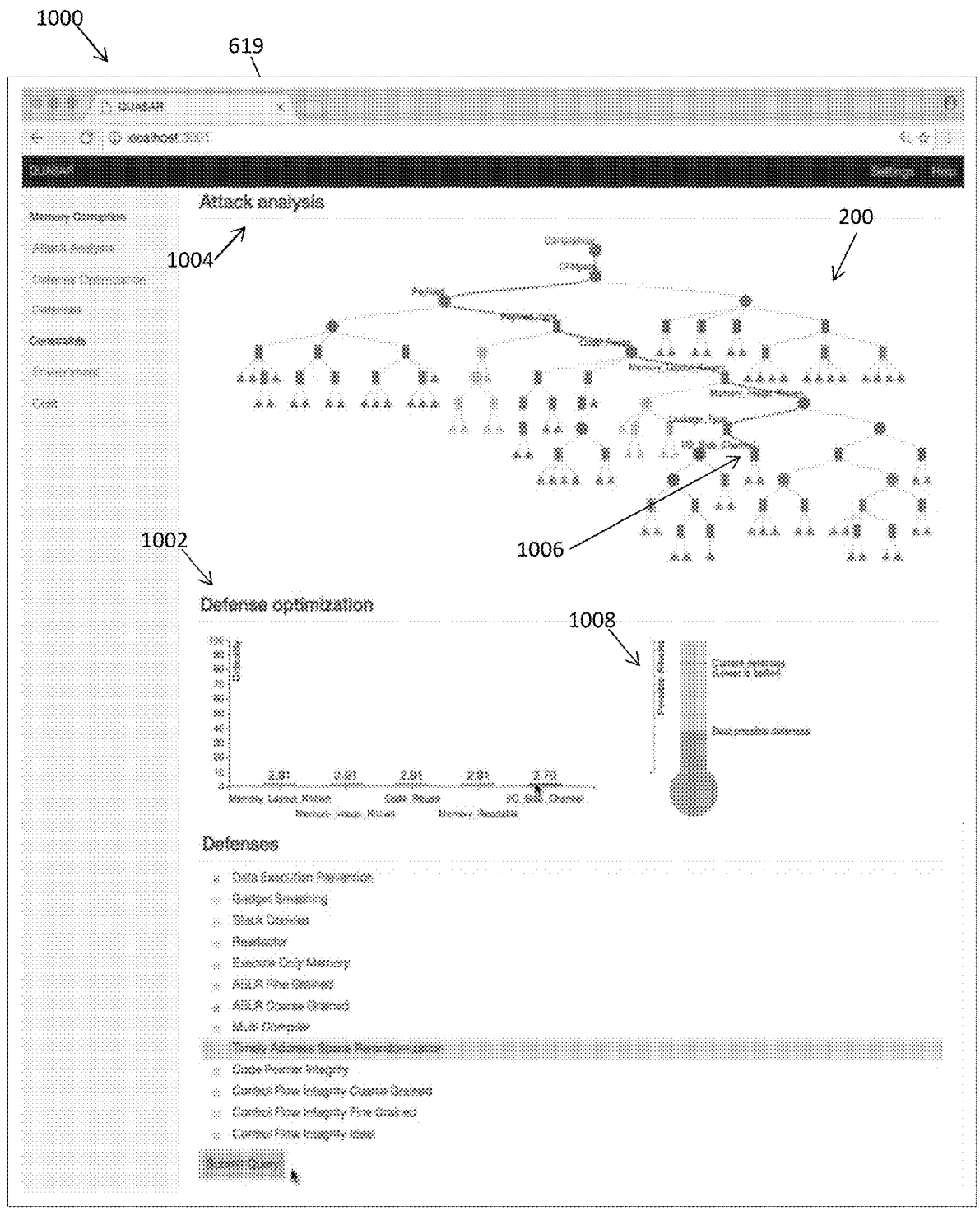
FIG. 10 depicts an exemplary user interface illustrating a webpage with the defense optimization and the attack analysis associated with the one or more selected defense techniques in FIG. 9, according to an exemplary embodiment.

FIG. 10 depicts the exemplary user interface 619 illustrating an webpage 1000 showing defense optimization 1002 and attack analysis 1004 associated with the one or more selected defense techniques, according to an exemplary embodiment. In the illustrated example, the user selected and queried two defense techniques: data execution prevention and ASLR coarse grained. The webpage 1000 enables an user to view a defense optimization 1002 and attack analysis 1004 associated with the one or more selected defense techniques. Due to the selected defense techniques, the network defenses have improved as compared to FIG. 9, as shown by an improvement in current defenses in meter 1008.

The defense optimization 1002 displays attack criticality metrics associated with computer attack capabilities. In some embodiments, the defense optimization 1002 displays a predefined number of computer attack capabilities that have the highest attack criticality metrics. A computer attack capability that has a high attack criticality metric indicates that the computer attack capability is used by many security threats and has few of its own dependencies, and is thus more generalizable. Each attack criticality metric associated with a computer attack capability shown in FIG. 10 is a percentage based on a [0,1] interval.

The attack analysis 1004 displays an ACG (for example, ACG 200 shown in FIG. 2) representing attack criticality metrics. In some embodiments, the ACG 200 is color-coded based on the criticality of an attack capability given the selected defense techniques. In an exemplary embodiment, the criticality for each attack capability ranges from green-yellow-orange-red, with the most critical computer attack capabilities shown in red and the least critical computer attack capabilities shown in green. As shown at 1006, a user may select an attack capability to view a name of the attack capability as well as upstream names.

Figure 11:
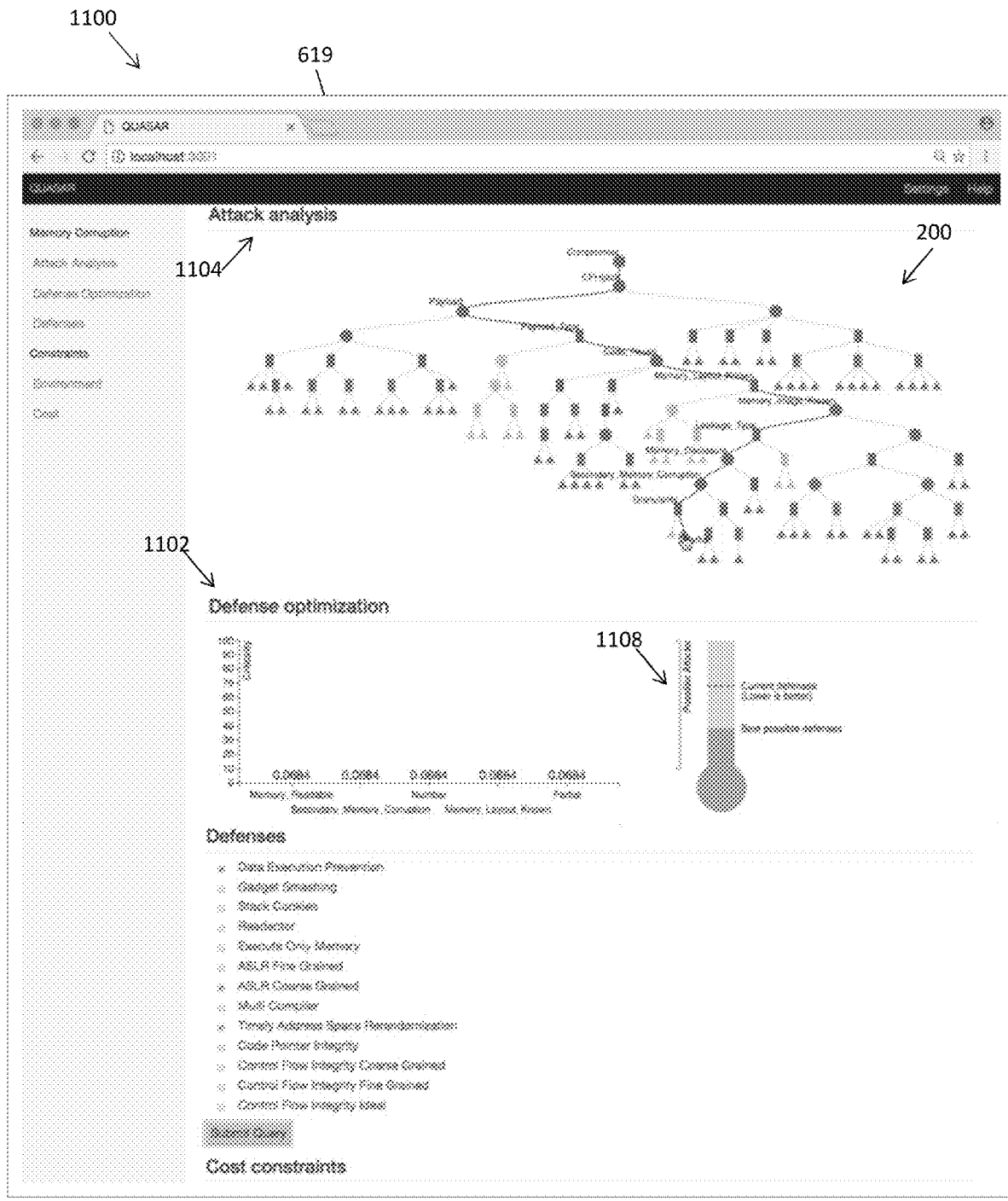
FIG. 11 depicts an exemplary user interface illustrating a webpage showing defense optimization and attack analysis associated with the one or more selected defense techniques in FIG. 10 and an additionally selected defense, according to an exemplary embodiment.

FIG. 11 depicts the exemplary user interface 619 illustrating a webpage 1100 showing defense optimization 1102 and attack analysis 1104 associated with an additionally selected defense, according to an exemplary embodiment. In the example shown in FIG. 11, the user selected and queried three defenses: data execution prevention, ASLR coarse grained, and an additionally selected defense, timely address space randomization. The webpage 1100 enables an user to view a defense optimization 1102 and attack analysis 1104 associated with the one or more selected defenses selected in FIG. 10 and an additionally selected defense. Due to the additionally selected defense, the network defenses has improved as compared to FIG. 10, as shown, for example, by comparing meter 1008 shown in FIG. 10 with meter 1108 shown in FIG. 11.

The following description is presented to enable a person skilled in the art to create and use a computer system configuration and related method and systems for assessing a computer defense technique. Various modifications to the exemplary embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the embodiments taught herein may be practiced without the use of these specific details. Thus, the present disclosure is not intended to be limited to the embodiments shown, but is to be accorded the widest scope consistent with the principles and features disclosed herein.

In describing exemplary embodiments, specific terminology is used for the sake of clarity. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A computer-implemented method for assessing a defense technique, the method comprising:
executing a reasoning engine that receives as an input to the reasoning engine a query that includes an indicia of a defense technique to a computer security threat;
translating, using the reasoning engine, the defense technique into a propositional logic constraint on a queryable representation of a Boolean formula representing a model compiled from a set of computer security threats and a set of defense techniques;
performing, using the reasoning engine, an assessment of the defense technique based on the propositional logic constraint on the queryable representation, to quantify the defense technique relative to a member of the set of computer security threats; and
displaying, using the reasoning engine, a result of the assessment to indicate a level of security provided by the defense technique to the member.

2. The method of claim 1, wherein the queryable representation of the Boolean formula is in smoothed deterministic decomposable negation normal form stored in a memory.

3. The method of claim 1, further comprising:
accepting, using a model compiler, as a first input a representation of the set of computer security threats;
accepting, using the model compiler, as a second input a representation of the set of defense techniques;
compiling, using the model compiler, the first input and the second input into the Boolean formula representing the set of computer security threats and the set of defense techniques;
accepting, using a # SAT satisfiability solver, as a first input the Boolean formula; and
encoding, using the # SAT satisfiability solver, the Boolean formula into the queryable representation.

4. The method of claim 3, wherein the representation of the set of computer security threats is a tree-like structure with a root node and one or more leaf nodes, the root node and the one or more leaf nodes representing capabilities of the set of computer security threats.

5. The method of claim 4, wherein the root node is dependent on the one or more leaf nodes, the root node requiring all of the one or more leaf nodes or any of the one or more leaf nodes to be used.

6. The method of claim 3, wherein the Boolean formula is in conjunctive normal form.

7. The method of claim 3, further comprising holding the first input and the second input in a repository stored on a database.

8. The method of claim 3, further comprising using a semantic enrichment module, metadata to reintroduce computer security threat information and defense technique information into the queryable representation that was lost during the conversion of the Boolean formula to the queryable representation.

9. The method of claim 1, further comprising performing, using the reasoning engine, the assessment to identify one or more computer security threats unconstrained by the defense technique.

10. The method of claim 1, further comprising:
receiving, using a user interface, the query from a user; and
displaying, using the user interface, the result.

11. The method of claim 1, further comprising:
determining, using a metrics computation engine, a number of computer security threats available when the defense technique is deployed; and
computing, using the metrics computation engine, a defense coverage value associated with the number of computer security threats available when the defense technique is deployed, to a number of computer security threats available when no defense techniques are deployed.

12. The method of claim 1, further comprising:
determining, using a metrics computation engine, a first number of computer security threats from the set of computer security threats that are available when the defense technique is deployed;
determining, using the metrics computation engine, a second number of computer security threats from the set of computer security threats that are available when the defense technique is deployed that depend on a common threat capability; and
computing, using the metrics computation engine, a threat criticality value for the common threat capability by dividing the second number by the first number, the threat criticality value associated with a proportion of successful computer security threats that rely on an availability of the common threat capability.

13. The method of claim 1, wherein the defense technique is a set of constraints of the representation that disables one or more computer security threats.

14. A system comprising:
a memory storing executable instructions to execute:
a reasoning engine:
receives as an input a query that includes an indicia of a defense technique to a computer security threat;
translating the defense technique into a propositional logic constraint on a queryable representation of a Boolean formula representing a model compiled from a set of computer security threats and a set of defense techniques;
performing an assessment of the defense technique based on the propositional logic constraint on the queryable representation, to quantify the defense technique relative to a member of the set of computer security threats; and
displaying a result of the assessment to indicate a level of security provided by the defense technique to the member; and
a processor coupled to the memory to execute the executable instructions stored therein to generate as output the result of the query.

15. The system of claim 14, wherein the queryable representation of the Boolean formula is in smoothed deterministic decomposable negation normal form stored in the memory.

16. The system of claim 14, the memory storing executable instructions to execute:
a model compiler:
accepting as a first input a representation of the set of computer security threats;
accepting as a second input a representation of the set of defense techniques; and
compiling the first input and the second input into the Boolean formula representing the set of computer security threats and the set of defense techniques; and
a # SAT satisfiability solver:
accepting as a first input the Boolean formula; and
encoding the Boolean formula into the queryable representation.

17. The system of claim 16, wherein the representation of the set of computer security threats is a tree-like structure with a root node and one or more leaf nodes, the root node and the one or more leaf nodes representing capabilities of the set of computer security threats.

18. The system of claim 17, wherein the root node is dependent on the one or more leaf nodes, the root node requiring all of the one or more leaf nodes or any of the one or more leaf nodes to be used.

19. The system of claim 16, wherein the Boolean formula is in conjunctive normal form.

20. The system of claim 16, further comprising a repository stored on a database, the repository holding the first input and the second input.

21. The system of claim 16, further comprising a semantic enrichment module configured to use metadata to reintroduce computer security threat information and defense technique information into the queryable representation that was lost during the conversion of the Boolean formula to the queryable representation.

22. The system of claim 14, wherein the reasoning engine performs the assessment to identify one or more computer security threats unconstrained by the defense technique.

23. The system of claim 14, further comprising a user interface that receives the query from a user using the user interface and displays the result.

24. The system of claim 14, further comprising a metrics computation engine configured to:
determine a number of known computer security threats available when the defense technique is deployed; and
compute a defense coverage value associated with the number of computer security threats available when the defense technique is deployed, to a number of computer security threats available when no defense techniques are deployed.

25. The system of claim 14, further comprising a metrics computation engine configured to:
determine a first number of computer security threats from the set of computer security threats that are available when the defense technique is deployed;
determine a second number of computer security threats from the set of computer security threats that are available when the defense technique is deployed that depend on a common threat capability; and
compute a threat criticality value for the common threat capability by dividing the second number by the first number, the threat criticality value associated with a proportion of successful computer security threats that rely on an availability of the common threat capability.

26. The system of claim 14, wherein the defense technique is a set of constraints of the representation that disables one or more computer security threats.

27. A non-transitory computer readable medium storing instructions executable by a processing device, wherein execution of the instructions causes the processing device to implement a method for assessing a defense technique comprising:
- receiving, using a reasoning engine, as an input a query that includes an indicia of a defense technique to a computer security threat;
- translating, using the reasoning engine, the defense technique into a propositional logic constraint on a queryable representation of a Boolean formula representing a model compiled from a set of computer security threats and a set of defense techniques;
- performing, using the reasoning engine, an assessment of the defense technique based on the propositional logic constraint on the queryable representation, to quantify the defense technique relative to a member of the set of computer security threats; and
- displaying, using the reasoning engine, a result of the assessment to indicate a level of security provided by the defense technique to the member.

28. The non-transitory computer readable medium of claim 27, wherein the queryable representation of the Boolean formula is in smoothed deterministic decomposable negation normal form stored in a memory.

29. The non-transitory computer readable medium of claim 27, further comprising:
- accepting, using a model compiler, as a first input a representation of the set of computer security threats;
- accepting, using the model compiler, as a second input a representation of the set of defense techniques; and
- compiling, using the model compiler, the first input and the second input into the Boolean formula representing the set of computer security threats and the set of defense techniques; and
- accepting, using a # SAT satisfiability solver, as a first input the Boolean formula; and
- encoding, using the # SAT satisfiability solver, the Boolean formula into the queryable representation.

30. The non-transitory computer readable medium of claim 29, wherein the representation of the set of computer security threats is a tree-like structure with a root node and one or more leaf nodes, the root node and the one or more leaf nodes representing capabilities of the set of computer security threats.

31. The non-transitory computer readable medium of claim 30, wherein the root node is dependent on the one or more leaf nodes, the root node requiring all of the one or more leaf nodes or any of the one or more leaf nodes to be used.

32. The non-transitory computer readable medium of claim 29, wherein the Boolean formula is in conjunctive normal form.

33. The non-transitory computer readable medium of claim 29, further comprising holding the first input and the second input in a repository stored on a database.

34. The non-transitory computer readable medium of claim 29, further comprising using a semantic enrichment module, metadata to reintroduce computer security threat information and defense technique information into the queryable representation that was lost during the conversion of the Boolean formula to the queryable representation.

35. The non-transitory computer readable medium of claim 27, further comprising performing, using the reasoning engine, the assessment to identify one or more computer security threats unconstrained by the defense technique.

36. The non-transitory computer readable medium of claim 27, further comprising:
- receiving, using a user interface, the query from a user; and
- displaying, using the user interface, the result.

37. The non-transitory computer readable medium of claim 27, further comprising:
- determining, using a metrics computation engine, a number of computer security threats available when the defense technique is deployed; and
- computing, using the metrics computation engine, a defense coverage value associated with the number of computer security threats available when the defense technique is deployed, to a number of computer security threats available when no defense techniques are deployed.

38. The non-transitory computer readable medium of claim 27, further comprising:
- determining, using a metrics computation engine, a first number of computer security threats from the set of computer security threats that are available when the defense technique is deployed;
- determining, using the metrics computation engine, a second number of computer security threats from the set of computer security threats that are available when the defense technique is deployed that depend on a common threat capability; and
- computing, using the metrics computation engine, a threat criticality value for the common threat capability by dividing the second number by the first number, the threat criticality value associated with a proportion of successful computer security threats that rely on an availability of the common threat capability.

39. The non-transitory computer readable medium of claim 27, wherein the defense technique is a set of constraints of the representation that disables one or more computer security threats.

* * * * *